United States Patent
Neukirchner et al.

(10) Patent No.: US 10,451,112 B2
(45) Date of Patent: Oct. 22, 2019

(54) BALL BEARING CAGE

(71) Applicant: Schaeffler Technologies AG & Co. KG, Herzogenaurach (DE)

(72) Inventors: Jörg Neukirchner, Euerbach (DE); Michael Pausch, Dittelbrunn (DE); Tobias Hock, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/773,435

(22) PCT Filed: Oct. 19, 2016

(86) PCT No.: PCT/DE2016/200478
§ 371 (c)(1),
(2) Date: May 3, 2018

(87) PCT Pub. No.: WO2017/088862
PCT Pub. Date: Jun. 1, 2017

(65) Prior Publication Data
US 2018/0335085 A1 Nov. 22, 2018

(30) Foreign Application Priority Data
Nov. 25, 2015 (DE) .................. 10 2015 223 255

(51) Int. Cl.
*F16C 33/38* (2006.01)
*F16C 19/06* (2006.01)
*F16C 19/16* (2006.01)

(52) U.S. Cl.
CPC .......... *F16C 33/3887* (2013.01); *F16C 19/06* (2013.01); *F16C 19/163* (2013.01); *F16C 33/3843* (2013.01); *F16C 33/3856* (2013.01); *F16C 2322/39* (2013.01); *Y02T 10/865* (2013.01)

(58) Field of Classification Search
CPC .... F16C 19/06; F16C 19/163; F16C 33/3843; F16C 33/3856; F16C 33/3887; F16C 2322/39; F16C 2240/30; Y02T 10/865
USPC ................ 384/470, 492, 523, 531, 533, 534
See application file for complete search history.

(56) References Cited

U.S. PATENT DOCUMENTS

| 1,172,858 A | 2/1916 | Winkler |
| 1,825,365 A * | 9/1931 | Runge ................... F16C 33/422 384/523 |
| 3,447,341 A | 6/1969 | Miller |

(Continued)

FOREIGN PATENT DOCUMENTS

| CN | 101918726 A | 12/2010 |
| CN | 102996646 A | 3/2013 |

(Continued)

*Primary Examiner* — Marcus Charles
(74) *Attorney, Agent, or Firm* — Antun M. Peakovic

(57) ABSTRACT

Cages for ball bearings are disclosed. In one example, a ball bearing cage includes two side rings interconnected by webs. Rolling element pockets, each of which may have a square basic shape with rounded corners, may be formed in a circumferential direction between the webs. The side rings, together with the webs, may form a guide contour of each rolling element pocket. The pockets may have four convex side contours between the corners thereof, and the side contours may point in a direction opposite to rounded portions in the corners.

9 Claims, 1 Drawing Sheet

(56) References Cited

U.S. PATENT DOCUMENTS

| | | | |
|---|---|---|---|
| 3,707,753 A | | 1/1973 | Bailey |
| 7,059,776 B2 * | | 6/2006 | Kobayashi ............ F16C 19/163 |
| | | | 384/470 |
| 8,979,383 B2 * | | 3/2015 | Carter ................. F16C 33/6677 |
| | | | 384/465 |
| 2009/0060407 A1 | | 3/2009 | Tachi et al. |

FOREIGN PATENT DOCUMENTS

| | | | | |
|---|---|---|---|---|
| CN | 103748372 A | | 4/2014 | |
| DE | 1684135 U | | 9/1954 | |
| DE | 102004018868 A1 | | 11/2004 | |
| DE | 102009042076 A1 | * | 3/2011 | .............. F16C 19/26 |
| DE | 202013000737 U1 | | 3/2013 | |
| DE | 102011088641 A1 | | 6/2013 | |
| DE | 102015224859 A1 | * | 6/2017 | .......... F16C 33/6614 |
| EP | 0819862 A1 | | 1/1998 | |
| EP | 2031259 A2 | | 3/2009 | |
| GB | 190911619 A | | 8/1909 | |
| GB | 1376289 A | * | 12/1974 | .............. F16D 3/227 |
| JP | 2007147010 A | * | 6/2007 | .......... F16C 33/3856 |
| JP | 2007170470 A | | 7/2007 | |
| JP | 2008133894 A | | 6/2008 | |
| JP | 2009144878 A | * | 7/2009 | .......... F16C 33/3806 |
| JP | 2009236163 A | * | 10/2009 | .......... F16C 33/3875 |
| JP | 2013142407 A | * | 7/2013 | .......... F16C 33/6674 |
| JP | 2014005848 A | * | 1/2014 | |
| JP | 6065423 B2 | * | 1/2017 | .............. F16C 33/46 |
| WO | WO-2011047925 A1 | * | 4/2011 | .......... F16C 19/163 |
| WO | WO-2016052232 A1 | * | 4/2016 | .............. F16C 19/16 |

* cited by examiner

BALL BEARING CAGE

CROSS-REFERENCE TO RELATED APPLICATIONS

This application is the U.S. National Phase of PCT Appln. No. PCT/DE2016/200478 filed Oct. 19, 2016, which claims priority to DE 102015223255.7 filed Nov. 25, 2015, the entire disclosures of which are incorporated by reference herein.

TECHNICAL FIELD

The disclosure relates to a ball bearing cage suitable for use in a ball bearing, such as a spindle bearing.

BACKGROUND

A cylindrical ball bearing cage known from JP 2008 133 894 A has rolling element pockets which have the basic shape of a rectangle, the corners of which are expanded by rounded regions. The rounding of the corners is intended to reduce mechanical stresses.

A ball bearing cage known from DE 10 2004 018 868 A1 has substantially cylindrical rolling element pockets, which are enlarged by four grooves which extend in the radial direction of the ball bearing cage and which modify the cylindrical basic shape of each rolling element pocket in a square pattern.

Another ball bearing cage which has rolling element pockets that combine geometrical features of cylindrical openings with rectangular basic shapes is known from JP 2007 170 470 A, for example.

SUMMARY

It is an object of the disclosure to specify a ball bearing cage which is developed beyond the prior art and which is distinguished by particularly low friction power and thus particular suitability for applications involving high rotational speed parameters, such as in a spindle bearing.

According to the disclosure, this object may be achieved by a ball bearing cage having the features described herein. The ball bearing cage may be constructed as an apertured cage having two side rings, wherein rolling element pockets for guiding respective balls are formed by webs, which interconnect the side rings, preferably integrally. As viewed radially from the outside in the direction of the central axis of the ball bearing cage, the basic shape of each rolling element pocket may be square. Here, two opposite portions of the side rings and two webs that are adjacent in the circumferential direction form the sides of the approximately square rolling element pocket. For a rolling element, e.g., a ball, guided in the ball bearing cage, the side rings, together with the webs, here form a guide contour of the rolling element pocket. Between its four corners, this guide contour having a square basic shape in each case describes a convex side contour pointing in a direction opposite to the rounded portions in the corners. Here, the characterization of the side contour as convex relates to the substantially elongate web or portion of a side ring which delimits the rolling element pocket. Looking at the ball bearing cage radially from the outside, the web or portion of the side ring is curved outward, e.g., in a convex manner, between the rounded corner portions of the rolling element pocket, with the result that the rolling element pocket has an inward curvature at the relevant point. In contrast, the rounded corner portions form outward curvatures of the rolling element pocket. An encircling edge contour of the rolling element pocket thus has four concave portions and four convex portions in each case.

A rolling element placed in the rolling element pocket may be supported at four points by the guide contour of the rolling element pocket, namely in both circumferential directions and in both axial directions of the rolling bearing. In this case, each support is a point support or at most a linear support, wherein the relevant line extends substantially in the radial direction of the ball bearing cage. Particularly low-friction guidance of the rolling element is thereby obtained. At the same time, the rounded corners of the rolling element pocket form a significant lubricant reservoir, e.g. for lubricating grease, wherein the radius of the rounded corner portions of the rolling element pocket is significantly less than the rolling element radius. In contrast, the radius of curvature of the convex side contours of the rolling element pocket can be the same as the rolling element radius or even greater. Edge-free transitions are preferably provided between the convex side contours and the rounded corner portions of the rolling element pocket.

In one embodiment, the webs, which each describe two convex side contours that delimit adjacent rolling element pockets in the circumferential direction, extend further inward than the two side rings, e.g., toward the axis of rotation of the ball bearing cage. Overall, in particular by virtue of the webs, which are drawn inward from the side rings, each rolling element pocket preferably tapers radially from the outside inward. Accordingly, guide contours which support the rolling element in the circumferential direction of the ball bearing can extend over a larger range in the radial direction of the ball bearing than the guide contours which form a support in the axial direction of the ball bearing. The ball bearing cage is preferably supported by the rolling elements predominantly or exclusively by the webs as regards the radial direction. In this case, retaining projections of a rolling element pocket are formed by two webs that are adjacent in the circumferential direction, said projections being arranged closer to the axis of rotation of the ball bearing cage than the guide contours which transmit axial forces between the rolling elements and the ball bearing cage and which should be counted as part of the square basic shape of the rolling element pocket.

The height of a web, measured in the radial direction of the ball bearing cage, may be at least 1.5 times and at most 2.5 times, in particular at least twice, the side ring height, measured in the same direction. In contrast, the width of the web, measured in the axial direction of the ball bearing cage, may decrease radially from the outside inward. In this case, the width of the web at the inner edge thereof is preferably no more than one quarter of the total cage width, e.g., the total width of the ball bearing cage, measured in the axial direction. In cases in which the radially inner edge of the cage—to be more precise of the webs of the cage—describes a rounded contour, the width of the webs at the inner edge thereof, measured in the axial direction, may be approximately zero.

In one embodiment, those surfaces of two webs which face a rolling element pocket each describe a saddle surface. A saddle surface is taken to mean a surface which is oppositely curved in both main directions, e.g., anticlastically. The Gaussian curvature of the saddle surface is negative. Of particular advantage in the web surfaces shaped as saddle surfaces is the fact that these saddle surfaces guide the rolling elements along an extended line which extends in the circumferential direction of the rolling element and describes an arc of a circle, the axis of rotation of which is identical with the axis of rotation of the ball. At the same time, there is sufficient space adjacent to these guide lines, which lie in the central plane of the ball bearing cage, toward the two ends of the ball bearing cage, to hold a lubricant, which reaches the contact regions between the rolling elements and the ball bearing cage over short paths.

Overall, the continuously curved shape of the rolling element pockets, which has smooth transitions, provides advantageous contact surfaces between the rolling elements and the bearing cage, while, at the same time, large grease spaces are formed in volumes directly around the rolling elements.

It is possible to produce the ball bearing cage in an efficient manner from plastic, in particular fiber-reinforced plastic, and it is suitable for use in a spindle bearing in a machine tool, for example. The rolling bearing in which the ball bearing cage is used can be a deep-groove ball bearing, a four-point bearing or an angular ball bearing, for example. In each case, the rolling elements, namely balls, are guided with little friction in the ball bearing cage by the multiply concave-convex guide contour of each rolling element pocket, while, at the same time, good lubrication conditions are achieved, even in the case of grease lubrication.

BRIEF DESCRIPTION OF THE DRAWINGS

An embodiment of the ball bearing cage designed in accordance with the disclosure is explained in greater detail below with reference to the attached drawings, in which.

DETAILED DESCRIPTION

Figure 1:
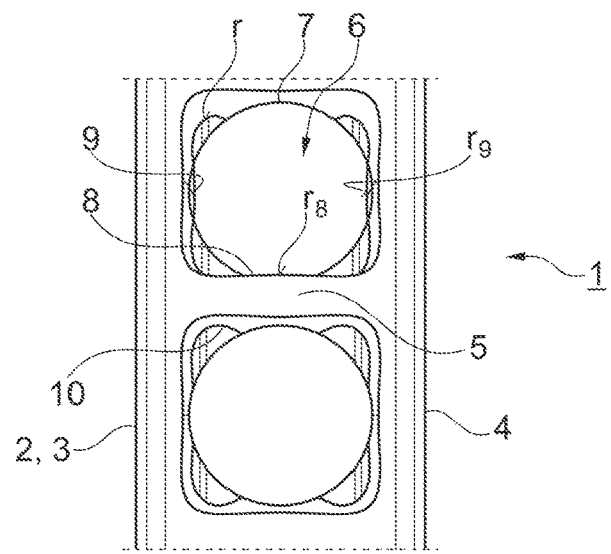
FIG. 1 shows a detail of a ball bearing having a ball bearing cage in plan view.

FIG. 1 shows, in a radial direction and in plan view, a rolling bearing, namely a ball bearing, denoted overall by the reference sign 1, having a ball bearing cage 2, which is designed as an apertured cage made of plastic. Two side rings 3, 4 of the ball bearing cage 2 are interconnected integrally by webs 5, which extend in the axial direction of the rolling bearing 1. A rolling element pocket 6 to hold a rolling element 7, namely a ball, is formed between each two webs 5 adjacent in the circumferential direction. Each rolling element pocket 6 has the basic shape of a square with rounded corners in the view according to FIG. 1, wherein a corner radius is denoted by r. The four corners of the rolling element pocket 6 are interconnected by side contours 8, 9. In this arrangement, two side contours 8, which are substantially parallel to one another, are formed by two webs 5, while the two other side contours 9 of the rolling element pocket 6, which are likewise substantially parallel to one another, are formed by the side rings 3, 4. Each side contour 8, 9 has a rounded, outward-curved, e.g., convex, shape in relation to the web 5 or the side ring 3, 4. This means that, starting from the regions of transition from the web to the side rings 3, 4, each web 5 widens toward the center of the web 5, e.g., toward the central plane of the ball bearing cage 2. Similarly, the side rings 3, 4 are widened centrally between two adjacent webs 5 in the circumferential direction, e.g., in the center of a rolling element pocket 6. The four side contours 8, 9 of the rolling element pocket 6, together with the rounded corners of the rolling element pocket 6, describe a closed contour, which acts as a guide contour 10 and has four convex and four concave regions in each case in the radial plan view according to FIG. 1. The radius of curvature of the convex regions, e.g., the side contours 8, 9, is denoted by r8 and r9, respectively. In the illustrative embodiment, the radii of curvature r8, r9 on the webs 5 and the side rings 3, 4, respectively, are identical and are at least twice as large as the corner radius r at each corner of the rolling element pocket 6.

Figure 2:
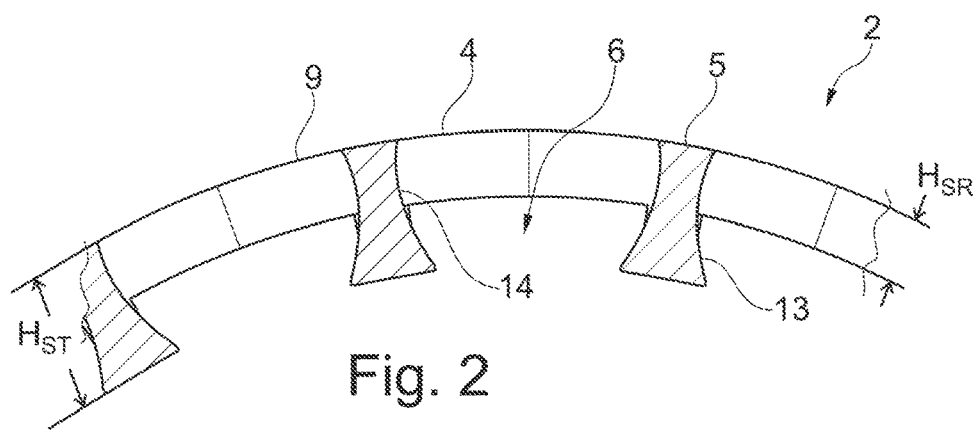
FIG. 2 shows the ball bearing cage of the arrangement shown in FIG. 1 in section.
Figure 3:
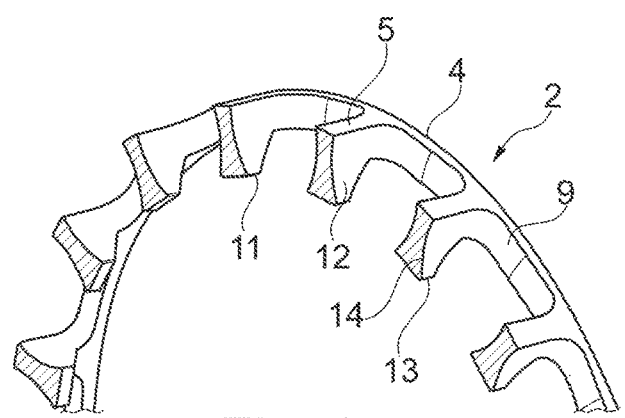
FIG. 3 shows the ball bearing cage according to FIG. 2 in a sectioned perspective view.

From the side rings 3, 4, as FIGS. 2 and 3, in particular, show, the webs 5 extend inward in the radial direction of the ball bearing cage 2. The height of each web 5, measured in the radial direction of the side rings 3, 4, and hence of the overall ball bearing cage 2, is denoted by HST and is about twice the side ring height of the side rings 3, 4, measured in the same direction and denoted by HSR.

While the webs 5 become thicker in the circumferential direction of the ball bearing cage 2 in the region in which they project inward beyond the side rings 3, 4, thereby matching the shape of the balls 7, the width of the webs 5, measured in the axial direction of the rolling bearing 1, decreases from the outside inward. The innermost points of the ball bearing cage 2 are formed by rounded portions 11 on the webs 5, which can be seen best in the tangential plan view of a web 5. In approximate terms, the inward-facing contour of each web 5, that is to say the contour facing the rolling bearing axis, describes the shape of a U or of a V slightly rounded at the tip thereof in a tangential plan view of the web 5. By this U or V-shaped contour and a surface that fills this contour, together with the contour on the outer circumference of the ball bearing cage 2, a saddle surface 12 is described on the two circumferential sides of each web 5. Here, the innermost points of the saddle surfaces 12 in the radial direction form retaining projections 13 of the webs 5. A guide line 14, against which the rolling element 7 can run, extends on each saddle surface 12 from the retaining projections 13 to the outer circumference of the ball bearing cage 2. All the guide lines 14 lie in a plane which is identical with the central plane of the ball bearing cage 2, e.g., is arranged centrally between the two ends of the ball bearing cage 2. Thus, the guide lines 14 are situated in regions of the rolling bearing 1 in which the relative speed of the rolling elements 7 and the ball bearing cage 2 is at a maximum, contributing to rapid, uniform distribution of lubricants in the rolling bearing 1. During this process, lubricant, especially grease, is delivered into the contact regions between the rolling elements 7 and the ball bearing cage 2, in particular from the lubricant reservoirs situated in the corners of the rolling element pockets 6.

LIST OF REFERENCE SIGNS 1 rolling bearing
2 ball bearing cage
3 side ring
4 side ring
5 web
6 rolling element pocket
7 rolling element, ball
8 side contour
9 side contour
10 guide contour
11 rounded portion
12 saddle surface
13 retaining projection
14 guide line
HSR side ring height HST web height
r corner radius
r8 radius of curvature
r9 radius of curvature

The invention claimed is:

1. A ball bearing cage, comprising:
two side rings interconnected by webs; and
rolling element pockets, each of which has a square shape with rounded corners, are formed in a circumferential direction between the webs;
wherein the side rings, together with the webs, form a guide contour of each rolling element pocket, which has four convex side contours between the corners thereof, the side contours pointing in a direction opposite to rounded portions in the corners;
wherein the webs extend radially further inward than the side rings.

2. The ball bearing cage as claimed in claim 1, wherein each rolling element pocket tapers radially inward.

3. The ball bearing cage as claimed in claim 2, wherein a height of the web, measured in a radial direction of the side rings, is at least 1.5 times and at most 2.5 times a side ring height, measured in a same direction.

4. The ball bearing cage as claimed in claim 3, wherein a width of the web, measured in an axial direction of the side rings, decreases from the outside inward.

5. The ball bearing cage as claimed in claim 4, wherein the width of the web at an inner edge thereof is no more than one quarter of a total cage width.

6. The ball bearing cage as claimed in claim 5, wherein the inner edge of the cage describes a rounded portion.

7. The ball bearing cage as claimed in claim 2, wherein retaining projections of a rolling element pocket, which are arranged further in than the guide contour of the rolling element pocket in a radial direction of the side rings, are formed by two webs adjacent to one another in the circumferential direction.

8. The ball bearing cage as claimed in claim 1, wherein surfaces of the web which face the rolling element pockets each describe a saddle surface.

9. The use of a ball bearing cage as claimed in claim 1 in a spindle bearing.

* * * * *